Jan. 25, 1955  A. C. MACKAY  2,700,180
CONNECTING AND SEALING MEANS FOR CURING BAGS
Filed July 1, 1950  2 Sheets-Sheet 1
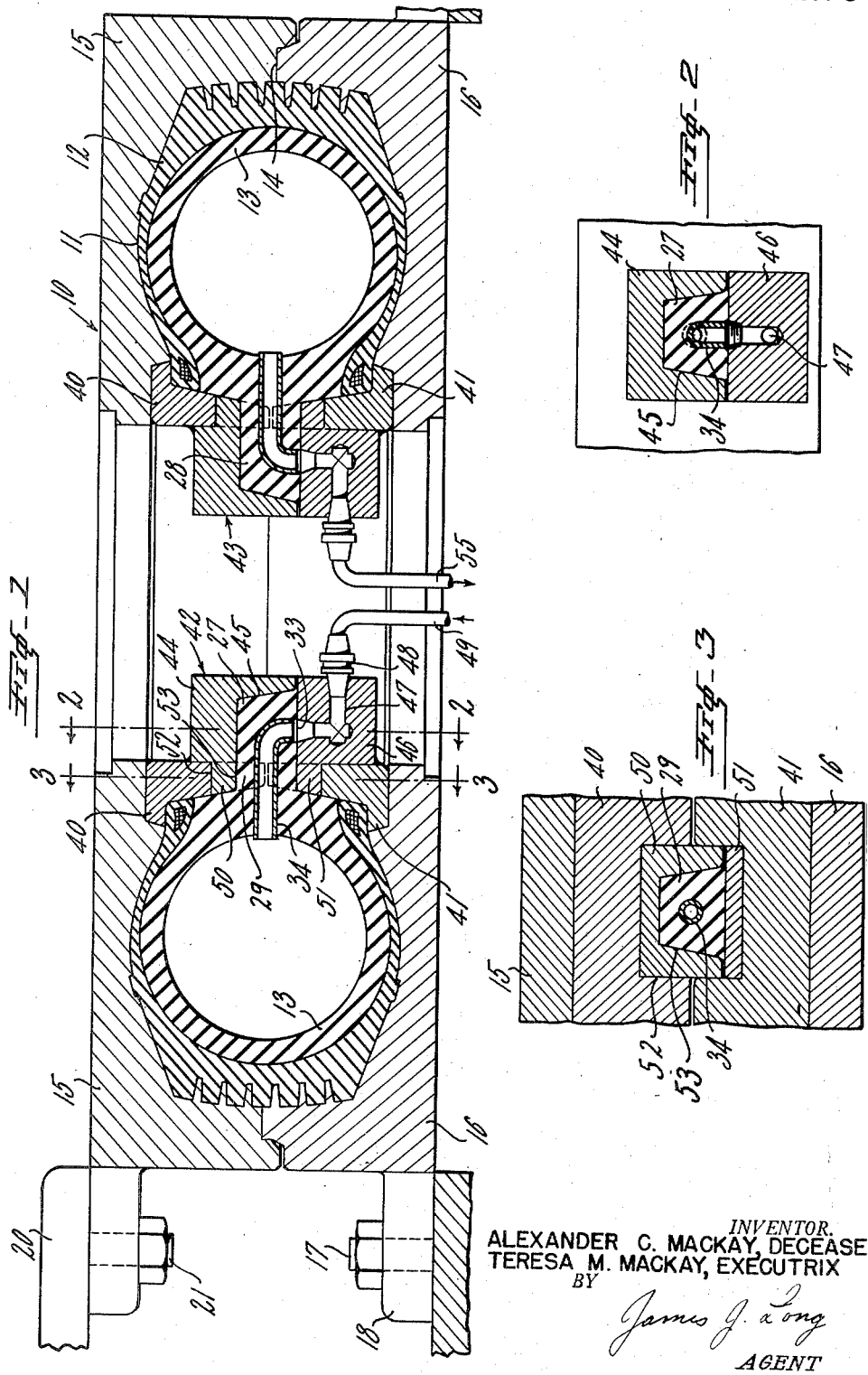
INVENTOR.
ALEXANDER C. MACKAY, DECEASED,
TERESA M. MACKAY, EXECUTRIX
BY
James J. Long
AGENT Jan. 25, 1955 A. C. MACKAY 2,700,180
CONNECTING AND SEALING MEANS FOR CURING BAGS
Filed July 1, 1950 2 Sheets-Sheet 2
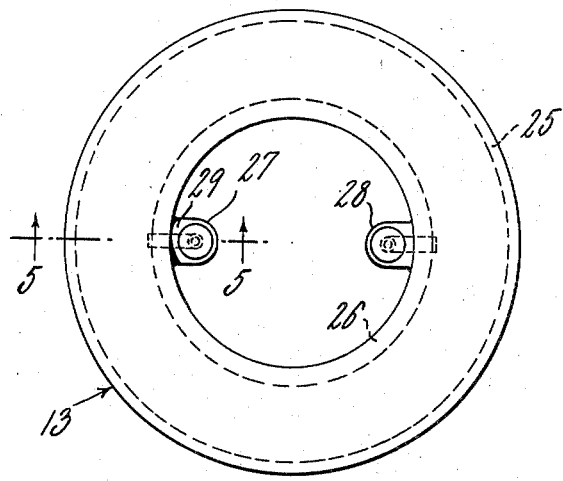
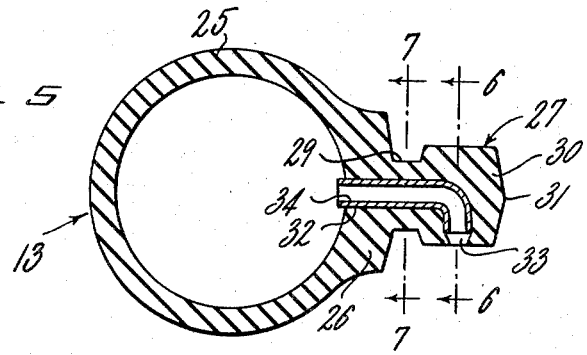
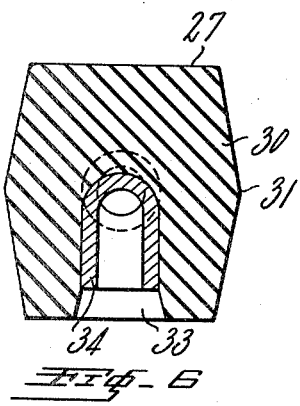 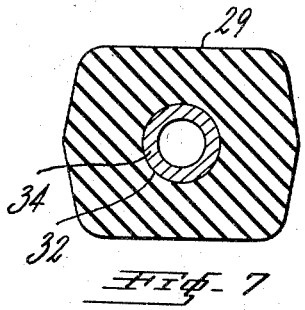
INVENTOR.
ALEXANDER C. MACKAY, DECEASED,
TERESA M. MACKAY, EXECUTRIX
BY James J. Long
AGENT

United States Patent Office 2,700,180
Patented Jan. 25, 1955

2,700,180

CONNECTING AND SEALING MEANS FOR CURING BAGS

Alexander C. Mackay, deceased, late of Kitchener, Ontario, Canada, by Teresa M. Mackay, executrix, Kitchener, Ontario, Canada, assignor to United States Rubber Company, New York, N. Y., a corporation of New Jersey Application July 1, 1950, Serial No. 171,665

5 Claims. (Cl. 18—38)

This invention relates to pneumatic tire shaping and vulcanizing apparatus and more particularly it relates to improved connecting and sealing means for curing bags for pneumatic tire.

In the manufacture of pneumatic tires, it is conventional practice first to assemble the component parts of the tire, such as the inextensible bead elements, the carcass portion and the tread and sidewall portions, usually in band form on a building drum, and thereafter to shape the tire with the aid of a curing bag, which is a hollow toroidal form having relatively thick walls of heat-resistant, extensible, resilient material, usually made of a natural rubber composition or of a synthetic rubber, such as butyl rubber. The curing bag has one or more inlets for introduction of a fluid medium under pressure, such as hot water or steam, and this fluid medium is used to apply internal pressure to expand the bag against the tire to make the latter conform to the shape of the heated mold in which the tire is vulcanized, such fluid medium also serving as a means for heating the tire internally to effect more rapid and more uniform vulcanization.

The inlet means for introduction of the fluid medium to the interior of the curing bag is usually a metal stem extending through the wall of the bag. In the past it had not always been possible to maintain such stem in tight, fluid-sealing relation with the wall of the curing bag, due to the difficulty of forming and maintaining a good adhesive bond between the metal stem and the rubber composition from which the bag is made. This difficulty is aggravated by the exposure of the bag and stem to high temperatures and pressures and to corrosive conditions during the vulcanization of the tire, as well as by the mechanical abuse to which the curing bag is subjected when it is inserted in the tire, and later removed therefrom, these operations requiring extreme twisting of the bag and rough pushing of the twisted bag into place.

As a result, the curing bag stems sometimes develop leaks, rendering the curing bag useless, and resulting in a defective or totally spoiled tire if the leak is not discovered before the tire is placed in the vulcanizing mold.

Accordingly, it is an object of the present invention to provide an improved connecting and sealing means for introduction of a fluid medium under pressure into a curing bag.

Another object of the invention is to provide a connecting and sealing means for curing bags which is essentially independent of any rubber-to-metal adhesive bond.

Still another object is the provision of a curing bag having increased service life and being capable of withstanding considerable mechanical abuse.

A further object is to provide a curing bag and tire vulcanizing mold which cooperate to effect an improved seal.

Still a further object is the provision of an improved tire vulcanizing mold having means for forming a tight seal with a curing bag inlet.

Further objects and advantages will be made evident in the following detailed description of the invention, when read in reference to the accompanying drawings, wherein Fig. 1 is a sectional view of the improved cooperating mold and curing bag of this invention, showing a pneumatic tire in the process of being vulcanized;

Fig. 2 is a fragmentary sectional view of the valve portion of the mold and curing bag assembly of Fig. 1, taken along line 2—2 of Fig. 1;

Fig. 3 is a similar view of the valve portion taken along line 3—3 of Fig. 1;

Fig. 4, is a plan view on a smaller scale of the improved curing bag;

Fig. 5 is a sectional view of the curing bag taken along line 5—5 of Fig. 4;

Fig. 6 is a sectional view on a larger scale of the bag valve taken along line 6—6 of Fig. 5; and Fig. 7 is a similar view of the bag valve taken along line 7—7 of Fig. 5.

Referring to the drawings, the apparatus shown therein comprises a vulcanizing mold assembly 10 having a toroidal cavity 11 in which is disposed a pneumatic tire 12 containing a curing bag 13. The mold 10 is split at a horizontal parting line 14 in the conventional manner, being composed of an upper mold half 15 and an intermeshing lower mold half 16. It will be understood that the mold 10 is disposed within the usual enclosing press (not shown), such as a McNeil press, which is adapted to clamp the mold halves 15 and 16 firmly together during vulcanization, and which is equipped with suitable means, such as steam chambers, for heating the mold 10 from the outside. The lower mold half 16 may be fastened to the enclosing press, as by a bolt 17 passing through a lug 18 extending from the mold half. The upper mold half 15 has a similar lug 19, which is fastened to a hinged member 20 of the enclosing press by means of a bolt 21. The hinge member 20 is adapted to lift up the upper mold half 15 as the press is opened for insertion or removal of the tire 12.

The curing bag 13 is of toroidal form, as shown in Fig. 4, and has a relatively thick wall 25 made of heat-resistant, extensible, resilient material, usually a vulcanized butyl rubber composition because this material has been found most resistant to the deteriorating effects of high temperature, oxygen, and migrating sulfur from the vulcanizable rubber compositions in the tire 12. After insertion in the tire 12, the bag 13 is adapted to be expanded by internal fluid pressure, causing the tire to fill out the mold cavity 11 and conform to the contour thereof as shown in Fig. 1. The rim area of the bag 13 is provided with a thicker wall portion 26 (Fig. 5) than the main wall 25 of the bag, the better to impart the desired shape to the bead region of the tire.

The fluid medium introduced under pressure into the interior of the bag 13 is heated to vulcanizing temperatures in order to shorten the time required for vulcanizing the tire 12, as well as to effect more uniform vulcanization thereof than would be possible if the tire mold 10 were heated from the outside only. In order to circulate such heated fluid medium through the bag, there are provided usually two connecting stems 27 and 28 extending radially from diametrically opposed points on the rim portion 26 (Fig. 4) of the bag 13, although one such stem may suffice if it is not necessary to actually circulate the fluid medium, as is the case when the fluid medium is steam.

Referring to Fig. 5, the stem 27 is shown as a generally bulbous extension from the wall of the curing bag, and is preferably composed of the same extensible resilient composition as the bag. The stem 27 has a narrow connecting portion or neck 29 (Figs. 4, 5 and 7) adjacent the rim wall 26 of the bag, and has an enlarged outer portion 30 which is flat on top and bottom and which is of somewhat greater diameter at its medial line 31 (Figs. 5 and 6) than at its top and bottom. A passageway 32 having a right angle bend therein passes from an inlet opening 33 in the bottom of the stem 27 to the interior of the bag. The passageway 32 is preferably lined over a portion of its length with a relatively rigid insert tube 34, which may be made of any suitable material, such as metal, for example, cast brass, or of a relatively tough cured plastic. The insert 34 may be adhered to the wall of the passage 32 in any suitable manner, although, as will be made evident hereinbelow, the sealing of the stem 27 against leakage of the fluid medium is independent of any adhesive bond between the insert tube 34 and the walls of the passage 32. The rigid insert tube 34 does not extend all the way to the inlet 33 of the passage 32 in order that the bulbous portion 30 of the stem 27 may be more easily deformable for a purpose which will be made evident below. The opposing stem 28 (Figs. 1 and 4) of the bag 13 is constructed in the same manner as the stem 27.

Turning now to the cooperating means associated with the mold 10 for forming the desired seal with the stems 27 and 28 on the curing bag 13, and referring to Fig. 1, the upper and lower mold halves 15 and 16 are provided with annular toe flanges 40 and 41, respectively, which shape the rim portions of the tire 12. These flanges may be integral with the mold, or bolted or welded thereto.

The flange members 40 and 41 carry two diametrically opposed connecting block assemblies 42 and 43 which are adapted to clamp the stems 27 and 28, respectively, of the curing bag 13 in fluid sealing engagement. The connecting block assembly 42 includes an upper block 44 (Figs. 1 and 3) which is welded or otherwise suitably attached to the upper mold ring 40, and which contains a cavity 45 (Fig. 1) in which the resilient stem 27 is retained and deformed when the mold is closed. A lower connecting block 46 (Figs. 1 and 3) is similarly attached to the lower mold ring 41 and cooperates with the upper block 44 to define the closed cavity 45 (Fig. 1) for the stem 27. The lower block 46 has an internal passageway 47 that connects the opening 33 of the stem 27 to a suitable detachable coupling 48, to which a fluid supply line such as a flexible metal hose 49 may be attached. The upper block 44 and lower block 46 are provided with cooperating members 50 and 51 (Figs. 1 and 2), respectively, which extend into an opening 52 defined by corresponding openings in the mold flange members 40 and 41. The neck 29 of the stem 27 passes snugly through an opening 53 defined by the members 50 and 51 when the mold is closed.

The connecting block assembly 43 has the same structure, and encloses the curing bag stem 28 in the same manner as the connecting block assembly 42. A fluid line 55 is coupled to the assembly 43 in the same manner as line 49, one of these lines serving as an inlet for the heating fluid, and the other serving as an outlet, so that fluid of the desired temperature may be continuously circulated through the bag 13 during the vulcanizing cycle.

In operation, the tire 12 containing the curing bag 13 is placed in the mold cavity 11 and the molding press is closed to clamp the mold halves 15 and 16 firmly together under pressure. The connecting block assemblies 42 and 43 clamp the resilient stem protuberances 27 and 28 of the curing bag 13 as the mold is closed. Comparison of the shape of the stem 27 in the unclamped state, as shown most clearly in Fig. 5, with the shape of the stem 27 when it is clamped in the cavity 45 of the connecting block assembly 42, as shown in Fig. 1, will reveal that the stem 27 is deformed considerably by the clamping action of the upper and lower connecting blocks 44 and 46. Specifically, the excess of resilient material provided at the medial line 31 of the bulbous extension 30 of the stem and the excess material provided on the upper and lower faces of the stem have been distorted and restrained in such a manner that pressure is exerted on the lower block 46 by the tendency of the valve to regain its original shape, thus sealing the connection. The narrow neck permits this distortion to take place circumferentially completely. In this way fluid supplied under high pressure by the line 49 can pass from the passage 47 in the lower connecting block 46 through the opening 33 in the stem 27 and thence through the insert tube 34 in the passage 32 of the stem into the interior of the bag 13, the whole sealing process being automatic with the closing of the press.

It should be noted that the seal formed in this manner is independent of any rubber-to-metal adhesive bond, or of any sort of permanent rubber-to-metal union. Thus, even if the adhesive bond between the insert tube 34 and the material of the bag 13 should fail so that fluid can leak therebetween, the tight seal between the opening 33 of the stem and the passage 47 in the lower connecting block 46 remains unaffected, so that the bag still does not leak. In fact, the insert tube 34 can be dispensed with entirely without affecting the seal, although it has been found that such a relatively rigid tube forestalls any tendency for the passage 32 through the stem to become narrowed with continued use.

The improved curing bag and connecting stem of this invention are easily and economically constructed, being less complex than the usual connecting stem arrangements. The connecting stem or protuberance may be molded integrally with the curing bag in a single operation during the manufacture thereof, or the connecting stem may be molded separately and subsequently united to the bag by suitable adhesive means, such union preferably taking place during final vulcanization of the bag so that a firm bond is formed and the stem and bag body become essentially integral. Although the stem is preferably made of the same heat-resistant, resilient, deformable material as the bag itself, it may also be made of a different suitable rubbery composition having the desirable elastic properties.

Since there are no joints or separate parts which can work loose from the present connecting means to spoil the sealing action, the present curing bag can therefore be subjected to rough handling, as well as to corrosive and other deteriorating influences without adverse effect, in comparison to conventional curing bags. Therefore, spoiling of the tire being vulcanized, which sometimes occurs with conventional stems when leaks develop therein, is eliminated.

It has been found in actual use that the improved sealing means of this invention remains in good condition throughout the life of the bag, so that replacement or repair of the stem during the life of the bag is unnecessary. With conventional stems it is usually necessary to continually inspect the stem, and make replacement and repairs thereof a number of times during the life of the bag. This adds materially to the cost of manufacture of the tires.

Having thus described the invention, what is claimed and is desired to protect by Letters Patent is:

1. A curing bag for application of internal fluid pressure to a pneumatic tire in process of manufacture, comprising a hollow body, a relatively narrow neck portion extending from said body, a bulbous connecting piece of greater diameter than said neck attached to said neck, said narrow neck and enlarged bulbous piece having an inlet passageway therethrough communicating with the interior of said hollow body, a rigid tube lining the greater part of said passageway, said hollow body, neck, and bulbous piece being integral and composed of extensible resilient material, said bulbous piece being deformable into fluid sealing contact with a fluid supply means applied thereto, the said inlet passageway describing a right angle path through said neck and enlarged bulbous piece so as to open at the bottom face of said bulbous piece, whereby, when the bag is disposed in a tire and enclosed in a vulcanizing mold, the said opening is adapted to be compressed against a fluid supply connecting means in fluid-sealing engagement therewith by compression exerted on the said bulbous piece by closure of the mold.

2. Apparatus for shaping and vulcanizing a pneumatic tire comprising, a two part tire mold having an opening through the wall thereof at the parting surfaces of the mold halves, a curing bag in said mold, said curing bag having an elongated stem of resilient rubbery material integrally united to the exterior surface of the curing bag, said stem extending through said opening through the wall of the mold, a pair of clamp members attached one to each mold half on opposite sides of said opening through the mold, said clamp members providing opposed clamping surfaces between which the free end of said stem is clamped when said mold halves are closed, said stem having a passageway therethrough extending from the interior of the curing bag and terminating in an opening through the exterior surface of the stem which is engaged by the clamping surface of one of said clamping members, said one of said clamping members having a passageway therethrough terminating at one end in an opening through the clamping surface thereof which is in alignment with said opening through the exterior surface of said stem, a fluid supply line connected to and communicating with the other end of said passageway through said one clamp member, the thickness of said stem in a direction normal to said clamping surfaces when uncompressed being in excess of the distance between said clamping surfaces when the mold halves are closed whereby when said stem is clamped between said clamping surfaces when the mold halves are closed the resilient material forming the free end of the stem is compressed and forms a fluid tight seal around said aligned openings through the surface of said stem and said surface of said one clamping member.

3. Apparatus for shaping and vulcanizing a pneumatic tire comprising, a tire mold having an annular tire molding cavity and an opening through the wall thereof, a curing bag in said cavity, said curing bag having an elongated stem of resilient rubbery material integrally united to the exterior surface of the bag and extending through said opening through the wall of said mold, a pair of opposed clamping members on the exterior surface of said mold disposed one on each of two opposite sides of the free end of said stem extending from said opening and movable towards each other, said clamping members providing opposed clamping surfaces between which said free end of said stem is clamped when said clamping members are moved together, said stem having a passageway therethrough extending from the interior of the curing bag and terminating in an opening through a surface of the free end of said stem engaged by one of said clamping surfaces of one of said clamping members, a passageway extending through said one of said clamping members and terminating in an opening through the clamping surface thereof which is in alignment with said opening through the surface of the free end of said stem, a fluid supply line connected to and communicating with the other end of said passageway through one of said clamping members, the thickness of the free end of said stem in a direction normal to the clamping surfaces when uncompressed being in excess of the distance between said clamping surfaces when said clamping members are moved together whereby when said clamping members are moved together to clamp said stem the material forming the stem will be compressed and form a fluid tight seal around said aligned openings through the surface of said stem and the clamping surface of said one of said clamping members.

4. Apparatus for shaping and vulcanizing a pneumatic tire comprising, a tire mold having an annular tire molding cavity, and an opening through the wall thereof, a curing bag in said cavity, said curing bag having an elongated stem of resilient rubbery material integrally united to the exterior surface of the bag and extending through said opening through the wall of said mold, a pair of clamping members on the exterior of said mold disposed one on each of two opposite sides of said opening and movable towards and away from each other, at least one of said clamping members having a recess in the side thereof opposed to the other of said clamping members which in conjunction with the opposed side of said other of said clamping members forms a chamber in which the free end of said stem is confined when said clamping members are moved together, said stem having a volume when uncompressed in excess of the volume of said chamber whereby when the free end of said stem is confined in said chamber, the material forming the free end of the stem is placed under compression, said stem having a passageway therethrough extending from the interior of said curing bag to an exterior surface of the free end of said stem confined in said chamber, one of said clamping members having a passageway therethrough terminating in an opening through the surface thereof forming a part of the wall of said chamber which is in alignment with said opening through the surface of the free end of the said stem, whereby the compressed condition of the material forming the free end of the stem provides a fluid tight seal around said aligned openings and a fluid supply line connected to and communicating with the other end of said passageway through one of said clamping members.

5. Apparatus for shaping and vulcanizing a pneumatic tire comprising, a two part tire mold having an opening through the wall thereof at the parting surfaces of the mold halves, a curing bag in said mold, said curing bag having an elongated stem of resilient rubbery material integrally united to the exterior surface of the curing bag, said stem extending through said opening through the wall of the mold, a pair of clamping members attached one to each mold half on opposite sides of said opening through the mold, at least one of said clamping members having a recess in the side thereof opposed to the other of said clamping members which in conjunction with the opposed side of the other of said clamping members forms when said mold halves are closed a chamber in which the free end of said stem is confined, said stem having a passageway therethrough extending from the interior of said curing bag and terminating in an opening through the exterior surface of the free end of said stem confined in said chamber, one of said clamping members having a passageway therethrough terminating in an opening through the surface thereof forming the wall of said chamber, said opening in the surface of said one of said clamping members being in alignment with the opening through the surface of the free end of said stem, the free end of said stem having a volume when uncompressed in excess of the volume of said chamber whereby when the free end of said stem is confined in said chamber upon closing the mold halves the material forming the free end of the stem is placed under compression and a fluid tight seal is thereby provided around said aligned openings.

References Cited in the file of this patent

UNITED STATES PATENTS

| Number | Name | Date |
|---|---|---|
| 1,041,216 | Woods | Oct. 15, 1912 |
| 1,695,872 | Van Reenes | Dec. 11, 1928 |
| 1,881,001 | Ternes | Oct. 4, 1932 |
| 1,921,533 | Maynard | Aug. 8, 1933 |
| 1,938,794 | Beighey | Dec. 12, 1933 |
| 1,982,673 | Laursen | Dec. 4, 1934 |
| 2,085,233 | Iverson | Oct. 20, 1936 |
| 2,250,196 | Honderich | July 22, 1941 |